US012632799B2

(12) United States Patent
Ding et al.

(10) Patent No.: US 12,632,799 B2
(45) Date of Patent: May 19, 2026

(54) COMMUNICATIONS SERVER, A METHOD, A USER DEVICE AND A BOOKING SYSTEM

(71) Applicant: GRABTAXI HOLDINGS PTE. LTD., Singapore (SG)

(72) Inventors: Chunda Ding, Beijing (CN); Zerun Dong, Beijing (CN); Jiang Liu, Beijing (CN); Nuo Xu, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 20 days.

(21) Appl. No.: 18/556,899

(22) PCT Filed: Jun. 8, 2022

(86) PCT No.: PCT/SG2022/050391
§ 371 (c)(1),
(2) Date: Oct. 24, 2023

(87) PCT Pub. No.: WO2023/277796
PCT Pub. Date: Jan. 5, 2023

(65) Prior Publication Data
US 2024/0202609 A1 Jun. 20, 2024

(30) Foreign Application Priority Data
Jun. 29, 2021 (SG) ............................ 10202107116R

(51) Int. Cl.
*G06Q 10/02* (2012.01)
*G06F 16/27* (2019.01)
*G06Q 50/40* (2024.01)

(52) U.S. Cl.
CPC ............. *G06Q 10/02* (2013.01); *G06F 16/27* (2019.01); *G06Q 50/40* (2024.01)

(58) Field of Classification Search
CPC ................................ G06Q 10/02; G06F 16/27
(Continued)

(56) References Cited

U.S. PATENT DOCUMENTS 9,509,617 B1 * 11/2016 Malmgren .......... H04L 43/0817
10,684,996 B1 6/2020 Rus
(Continued)

FOREIGN PATENT DOCUMENTS

EP 3467652 B1 * 6/2024 ............... G06F 9/50

OTHER PUBLICATIONS

B. M. Abdelhafiz, "Distributed Database Using Sharding Database Architecture," 2020 IEEE Asia-Pacific Conference on Computer Science and Data Engineering (CSDE), Gold Coast, Australia, 2020, pp. 1-17. (Year: 2020).*
(Continued)

*Primary Examiner* — Jeff Zimmerman
*Assistant Examiner* — Hunter Molnar
(74) *Attorney, Agent, or Firm* — Buckley, Maschoff & Talwalkar LLC

(57) ABSTRACT

A communications server apparatus for a distributed sharding database related to a transportation service comprising a processor and a memory, the communications server apparatus being configured, under control of the processor, to execute instructions stored in the memory to: determine whether rebalancing of a plurality of shard replicas stored on a plurality of server instances is required based on two or more quantitative metrics; if rebalancing is required, select a plurality of candidate rebalancing plans; and rank the candidates, and execute a selected rebalancing plan from the ranking if two or more quantitative metrics criteria are met for the selection.

7 Claims, 8 Drawing Sheets

(58) Field of Classification Search
USPC ........................................................... 705/5
See application file for complete search history.

(56) References Cited

U.S. PATENT DOCUMENTS

| | | | |
|---|---|---|---|
| 2002/0143763 | A1 | 10/2002 | Martin, Jr. et al. |
| 2004/0024861 | A1* | 2/2004 | Coughlin ............ H04L 67/1008 |
| | | | 709/224 |
| 2012/0254175 | A1 | 10/2012 | Horowitz et al. |
| 2013/0179657 | A1 | 7/2013 | Isomura et al. |
| 2015/0161564 | A1 | 6/2015 | Sweeney et al. |
| 2015/0319234 | A1* | 11/2015 | Wang .................... G06F 3/0683 |
| | | | 709/226 |
| 2016/0021186 | A1* | 1/2016 | de Sene ............. H04L 67/1097 |
| | | | 709/213 |
| 2017/0371910 | A1 | 12/2017 | Joo et al. |
| 2018/0089784 | A1 | 3/2018 | Yamashita et al. |
| 2019/0334991 | A1* | 10/2019 | Lin .......................... G06F 16/27 |
| 2021/0191913 | A1* | 6/2021 | Prasad ................ G06F 16/2282 |
| 2021/0312724 | A1* | 10/2021 | Petri ....................... H04W 4/40 |

OTHER PUBLICATIONS

S. Lin, H. Chen and F. Hu, "A Workload-Driven Approach to Dynamic Data Balancing in MongoDB," 2015 IEEE International Conference on Smart City/SocialCom/SustainCom (SmartCity), Chengdu, China, 2015, pp. 786-791. (Year: 2015).*
International Search Report and Written Opinion dated Jan. 16, 2023 which was issued in connection with PCT/SG2022/050391.

\* cited by examiner

102

100

106

106

106

106

104

104

104

108

---

| Algorithm 1: Uniformity level of availability zone |
| --- |
| Input: All the shards and replicas, the portfolio $P$ of each replica |
| Output: Uniformity score |

1   $score = 0$

// iterate each shard in the system

2   for *each shard $S$* do

3     for *each distinct pair of replica $(r, r')$ in $S$* do

4       if $AZ(r) == AZ(r')$ then

5         $score \leftarrow score + 1$;

6   return $score$

---

Figure 8:
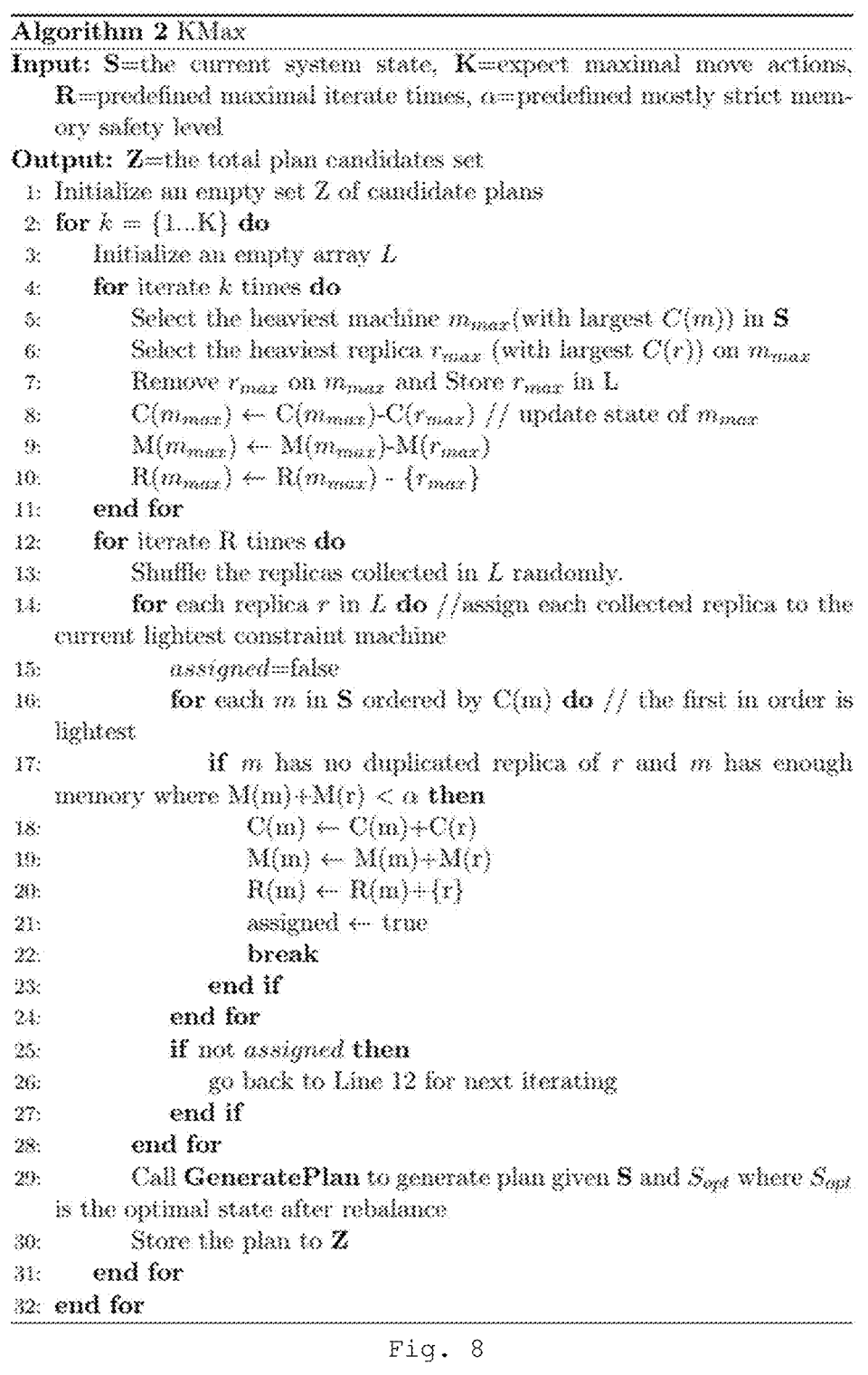

Algorithm 2 KMax
___
Input: S=the current system state, K=expect maximal move actions, R=predefined maximal iterate times, $\alpha$=predefined mostly strict memory safety level
Output: Z=the total plan candidates set
 1: Initialize an empty set Z of candidate plans
 2: for $k = \{1...K\}$ do
 3:     Initialize an empty array L
 4:     for iterate $k$ times do
 5:         Select the heaviest machine $m_{max}$(with largest $C(m)$) in S
 6:         Select the heaviest replica $r_{max}$ (with largest $C(r)$) on $m_{max}$
 7:         Remove $r_{max}$ on $m_{max}$ and Store $r_{max}$ in L
 8:         $C(m_{max}) \leftarrow C(m_{max})$-$C(r_{max})$ // update state of $m_{max}$
 9:         $M(m_{max}) \leftarrow M(m_{max})$-$M(r_{max})$
10:         $R(m_{max}) \leftarrow R(m_{max})$ - $\{r_{max}\}$
11:     end for
12:     for iterate R times do
13:         Shuffle the replicas collected in $L$ randomly.
14:         for each replica $r$ in $L$ do //assign each collected replica to the current lightest constraint machine
15:             *assigned*=false
16:             for each $m$ in S ordered by C(m) do // the first in order is lightest
17:                 if $m$ has no duplicated replica of $r$ and $m$ has enough memory where $M(m)$+$M(r)$ < $\alpha$ then
18:                     $C(m) \leftarrow C(m)$+$C(r)$
19:                     $M(m) \leftarrow M(m)$+$M(r)$
20:                     $R(m) \leftarrow R(m)$+$\{r\}$
21:                     assigned $\leftarrow$ true
22:                     break
23:                 end if
24:             end for
25:             if not *assigned* then
26:                 go back to Line 12 for next iterating
27:             end if
28:         end for
29:         Call GeneratePlan to generate plan given S and $S_{opt}$ where $S_{opt}$ is the optimal state after rebalance
30:         Store the plan to Z
31:     end for
32: end for
___

Algorithm 3 GenUnsortedActions

Input: S=the input system state,

Input: Sp=the optimal system state after rebalance,

Output: L=the unsorted actions array

1:   Generate positive set and negative set by the calculating the difference of S and Sp

2:   Initialize an empty array L

3:   for each two-tuple (mt,rt) in positive set do

4:      Find the first item (ms,rs) in negative set where rs==rt

5:      Generate an action(r,ms,mt) and store it to L

6:      Remove (ms,rs) in negative set

7:   end for

8:   Return L

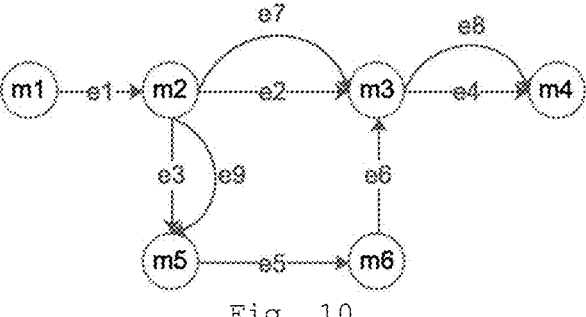

Figure 11:
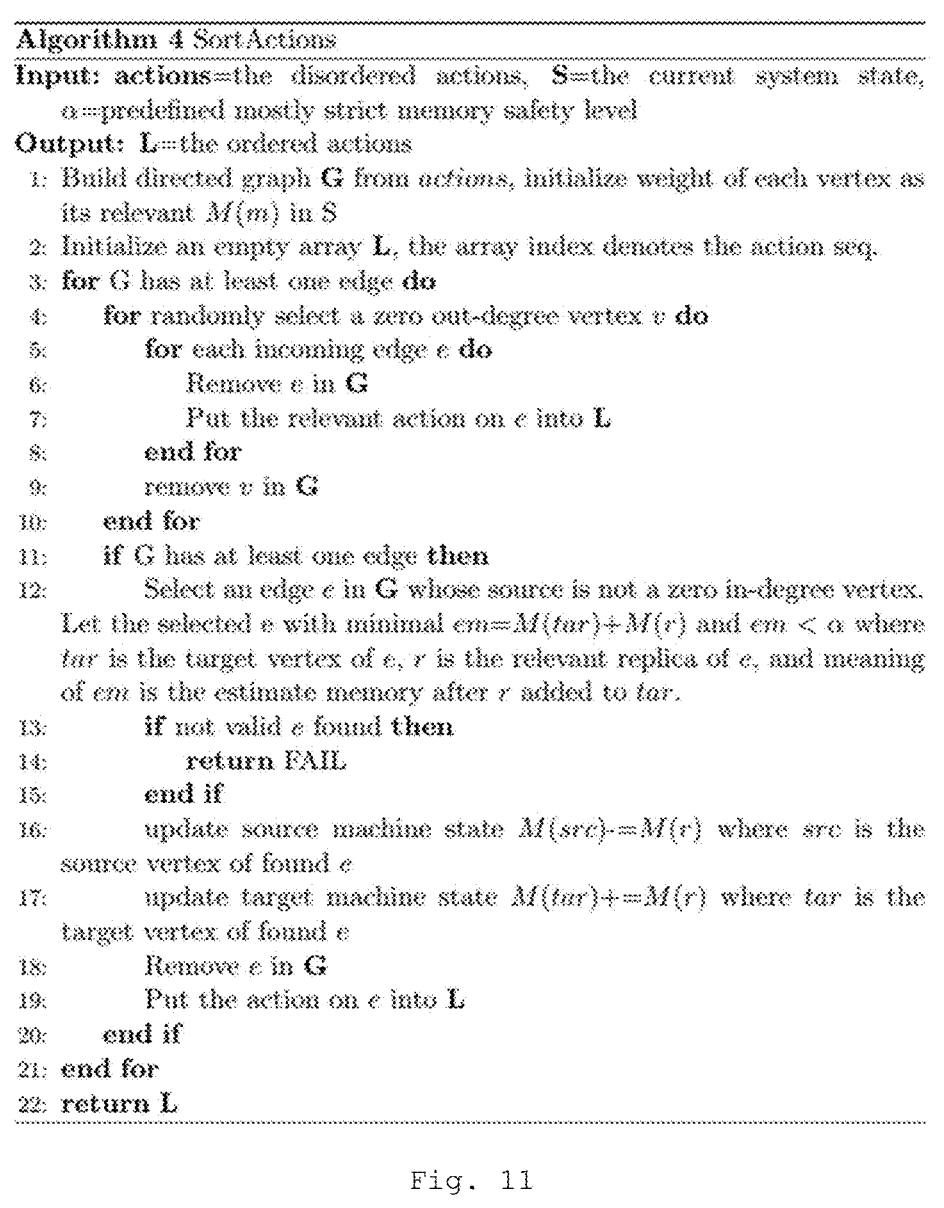

Algorithm 4 SortActions

---

Input: actions=the disordered actions, S=the current system state, $\alpha$=predefined mostly strict memory safety level

Output: L=the ordered actions

1: Build directed graph G from *actions*, initialize weight of each vertex as its relevant $M(m)$ in S 2: Initialize an empty array L, the array index denotes the action seq.

3: for G has at least one edge do

4:     for randomly select a zero out-degree vertex $v$ do

5:         for each incoming edge $e$ do

6:             Remove $e$ in G

7:             Put the relevant action on $e$ into L

8:         end for

9:         remove $v$ in G

10:     end for

11:     if G has at least one edge then

12:         Select an edge $e$ in G whose source is not a zero in-degree vertex. Let the selected $e$ with minimal $em=M(tar)+M(r)$ and $em < \alpha$ where $tar$ is the target vertex of $e$, $r$ is the relevant replica of $e$, and meaning of $em$ is the estimate memory after $r$ added to $tar$.

13:         if not valid $e$ found then

14:             return FAIL

15:         end if

16:         update source machine state $M(src)-=M(r)$ where $src$ is the source vertex of found $e$ 17:         update target machine state $M(tar)+=M(r)$ where $tar$ is the target vertex of found $e$ 18:         Remove $e$ in G

19:         Put the action on $e$ into L

20:     end if

21: end for

22: return L

COMMUNICATIONS SERVER, A METHOD, A USER DEVICE AND A BOOKING SYSTEM

The present invention is a 371 of International Application No. PCT/SG2022/050391, filed on Jun. 8, 2022, and claiming priority to Singapore Application No. 10202107116R filed on Jun. 29, 2021, incorporated by reference herein in its entirety.

TECHNICAL FIELD

The invention relates generally to the field of communications. One aspect of the invention relates to a communications server apparatus for a distributed sharding database related to a transportation service. Another aspect of the invention relates to a method, performed in a communications server apparatus for a distributed sharding database related to a transportation service. Another aspect of the invention relates to a communications device for communicating with a distributed sharding database related to a transportation service. Another aspect of the invention relates to a booking system for a transportation service. Another aspect of the invention relates to a method, performed in a distributed sharding database server related to a transportation service.

One aspect has particular, but not exclusive, application in ride hailing with a large number of drivers located in various disparate geographic locations. For example, where it may be necessary to store in a database the geographic location of each of the various drivers.

BACKGROUND

Various forms of database exist.

For example in G. Aggarwal, R. Motwani, and A. Zhu, "The Load Rebalancing Problem," in Proc. ACM SPAA, 2003, a proposal is given for rebalancing a distributed sharding database based only on memory usage. Similarly, U.S. Pat. No. 9,906,589, https://aws.amazon.com/blogs/open-source/open-distro-elasticsearch-shard-allocation/, and U.S. Ser. No. 10/091,087 propose various shard-based databases.

SUMMARY

Embodiments may be implemented as set out in the independent claims. Some optional features are defined in the dependent claims.

Implementation of the techniques disclosed herein may provide significant technical advantages. Advantages of one or more aspects may include:

Reduction in the imbalance of CPU utilisation by rebalancing under various sizes of shards and replicas, despite shards of different sizes;

Improve memory-safety. This may reduce the chance of instability or crashes;

Generate light-weighted rebalance execution. This may minimise the impact to the system and minimise the requirement of runtime resources; and/or Fitting well with cloud's native auto-scale policy on infrastructures like AWS or Azure.

In at least some implementations, the techniques disclosed herein may provide for multi-dimensional shards to consider all the runtime resources for customised sharding and provide a complete evaluation loop to predict the resource consumption per replica during rebalance (refer to imbalance detection). The runtime rebalance may be transformed into a multi-objective optimisation problem with constraints. The rebalance may be implemented by efficiently generating a feasible set of candidate solutions and an evaluation procedure which utilises both heuristic and domain knowledge to select the optimal rebalance plan given multiple constraints.

In at least some implementations, the techniques disclosed herein may allow for:

the technical solution of less hardware required for the same task for the technical problem of imbalanced CPU utilisation with a distributed, replicated sharded database;

the technical solution of improved reliability for the technical problem of increased chance of instability or crashes with shard management system;

the technical solution of faster execution for the same task for the technical problem of imbalanced CPU utilisation with a distributed, replicated sharded database;

the technical solution of responding dynamically for the technical problem of changed environmental conditions;

the technical solution of reducing greenhouse gas emissions by taking a particular route at a given time of day using a geographically based shard;

the technical solution of routing a driver of a "clean" electric-vehicle via a congested city centre route to reduce emissions in the congested area based on a geographically, and/or driver vehicle type, based shard;

the technical solution of reducing the data traffic transmitted between the server and the in-vehicle units based on smaller distributed shard replicas;

the technical solution of reducing the latency of data traffic transmitted between the server and the in-vehicle units based on better geographical distribution of shard replicas; and/or the technical solution of reduced data centre energy requirements based on optimally managed de-centralised shard replicas.

In an exemplary implementation, the functionality of the techniques disclosed herein may be implemented in software running on a server communications apparatus, such as a cloud based geographically distributed database. The software which implements the functionality of the techniques disclosed herein may be contained in a computer program, or computer program product—which operates the database instances on each server node in the cloud. When running on, for example, a cloud server, the hardware features of the server may be used to implement the functionality described below, such as using the server network communications interface components to establish the secure communications channel for redistributing shards across the distributed database in an efficient fashion.

BRIEF DESCRIPTION OF THE DRAWINGS

The invention will now be described, by way of example only, and with reference to the accompanying drawings in which:

FIG. 8 is a pseudo code listing of a first exemplary Algorithm 2.

FIG. 9 is a pseudo code listing of a first exemplary Algorithm 3.

FIG. 10. is a state diagram of a directed graph G representing actions execution.

FIG. 11 is a pseudo code listing of a first exemplary Algorithm 4.

DETAILED DESCRIPTION

The techniques described herein are described primarily with reference to use in taxi, ride hailing, ride sharing, food delivery, and pet transport, but it will be appreciated that these techniques have a broader reach and can be usefully implemented in other fields where a distributed database system is required.

Figure 1:
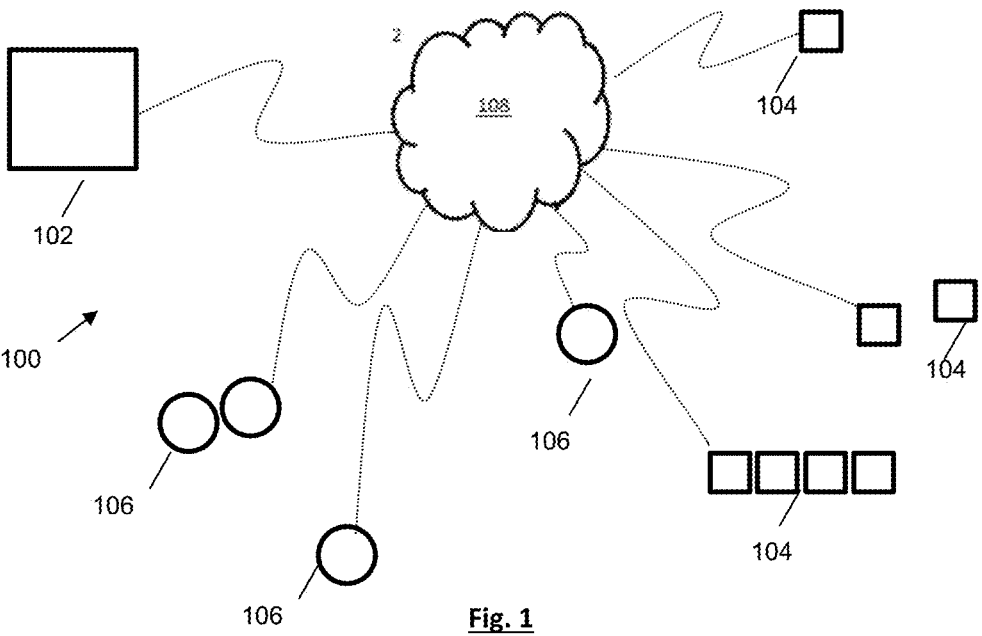
FIG. 1 is a schematic block diagram illustrating a first exemplary ride hailing service.

FIG. 1 shows a ride hailing system 100, with a number of users each having a communications device 104, a number of drivers each having a user interface communications device 106, a server 102 (or geographically distributed servers as will be described later) and communication links 108 connecting each of the components. Each user contacts the server 102 using an app on the communications device 104. The user app may allow the user to enter their pick-up location, a destination address, a level of service and/or after ride information such as a rating. The level of service may include the number of seats of the vehicle, the style of vehicle and/or what kind of transport service. It may be also used to order food or other deliveries. Each driver contacts the server 102 using an app on the communications device 106. The driver app allows the driver to indicate their availability to take jobs, information about their vehicle, their location and/or after ride info such as a rating. The server 102 may then match users to drivers, based on: geographic location of users and drivers, maximising revenue, user or driver feedback ratings, weather, driving conditions, traffic levels/accidents, relative demand and supply levels. This allows an efficient allocation of resources because the available fleet of drivers is optimised for the users' demand in each geographic zone.

Figure 2:
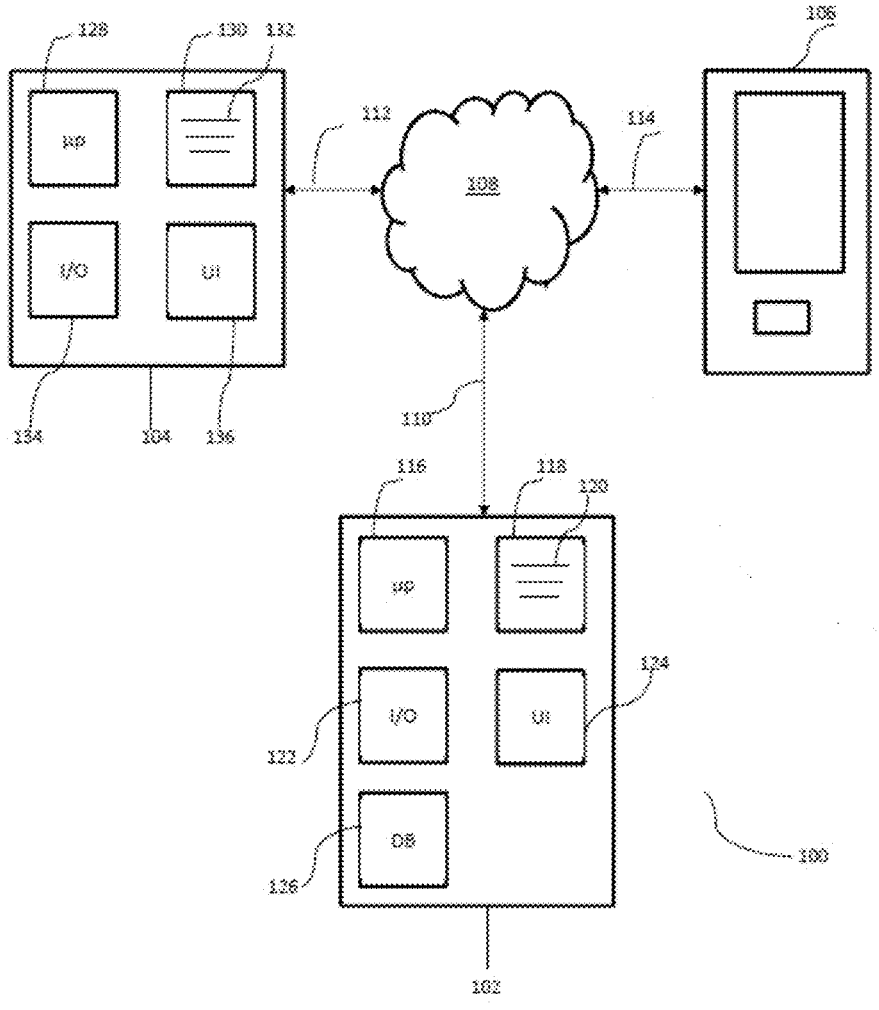
FIG. 2 is a schematic block diagram illustrating a first exemplary communications server apparatus for a distributed sharding database related to a transportation service.

Referring to FIG. 2, a communications apparatus 100 is illustrated which may be used to implement the system of FIG. 1. The communications apparatus 100 comprises the communications server 102, the user communications device 104 and the driver communications device 106. These devices are connected in the communications network 108 (for example, the Internet) through respective communications links 110, 112, 114 implementing, for example, internet communications protocols. The communications devices 104, 106 may be able to communicate through other communications networks, including mobile cellular communications networks, private data networks, fibre optic connections, laser communication, microwave communication, satellite communication, etc., but these are omitted from FIG. 2 for the sake of clarity.

The communications server apparatus 102 may be a single server as illustrated schematically in FIG. 2, or have the functionality performed by the server apparatus 102 distributed across multiple server components. In the example shown in FIG. 2, the communications server apparatus 102 may comprise a number of individual components including, but not limited to, one or more microprocessors 116, a memory 118 (e.g. a volatile memory such as a RAM) for the loading of executable instructions 120, the executable instructions 120 defining the functionality the server apparatus 102 carries out under control of the processor 116. The communications server apparatus 102 also comprises an input/output module 122 allowing the server to communicate over the communications network 108. User interface 124 is provided for user control and may comprise, for example, computing peripheral devices such as display monitors, computer keyboards and the like. The server apparatus 102 also comprises a database 126, the purpose of which will become readily apparent from the following discussion.

The user communications device 104 may comprise a number of individual components including, but not limited to, one or more microprocessors 128, a memory 130 (e.g. a volatile memory such as a RAM) for the loading of executable instructions 132, the executable instructions defining the functionality the user communications device 104 carries out under control of the processor 128. The user communications device 104 also comprises an input/output module 134 allowing the user communications device 104 to communicate over the communications network 108. A user interface 136 is provided for user control. If the user communications device 104 is, say, a smart phone or tablet device, the user interface 136 will have a touch panel display as is prevalent in many smart phone and other handheld devices. Alternatively, if the label communications device is, say, a desktop or laptop computer, the user interface 136 may have, for example, computing peripheral devices such as display monitors, computer keyboards and the like.

The driver communications device 106 may be, for example, a smart phone or tablet device with the same or a similar hardware architecture to that of the user communications device 104. Alternatively, the functionality may be integrated into a bespoke device such as a typical taxi job management device.

Figure 3:
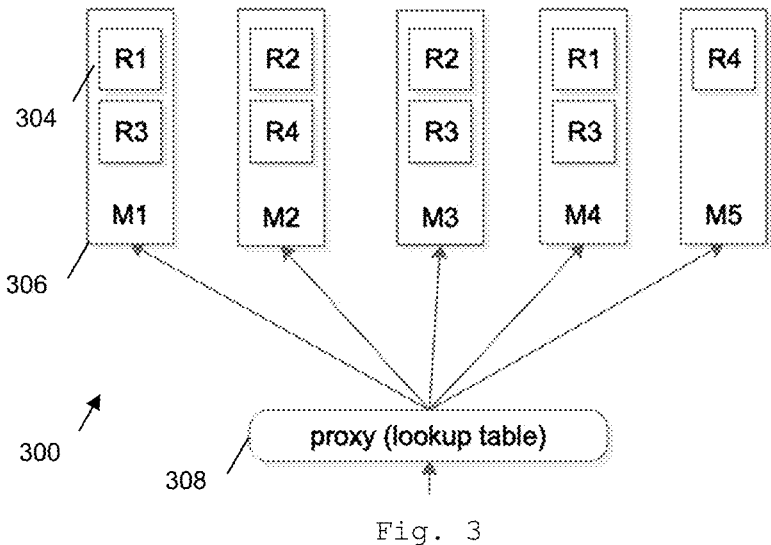
FIG. 3 is a schematic block diagram illustrating a first exemplary sharding system architecture.

Thus, it will be appreciated that FIGS. 2 and 3 and the foregoing description illustrate and describe a communications server apparatus 102 comprising a processor 116 and a memory 120, the communications server apparatus 102 being configured, under control of the processor 116, to execute instructions 120 stored in the memory 118:

to determine whether rebalancing of a plurality of shard replicas stored on a plurality of server instances is required based on two or more quantitative metrics;

if rebalancing is required, select a plurality of candidate rebalancing plans; and rank the candidates, and execute a selected rebalancing plan from the ranking if two or more quantitative metrics criteria are met for the selection.

Figure 4:
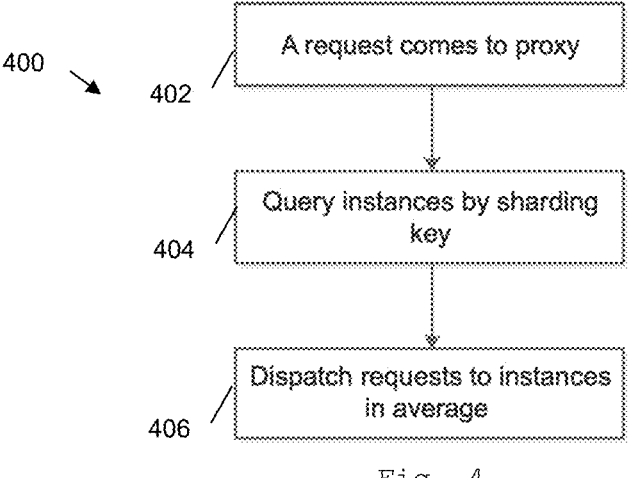
FIG. 4 is a flow diagram illustrating a first exemplary processing flow.
Figures 5, 6:
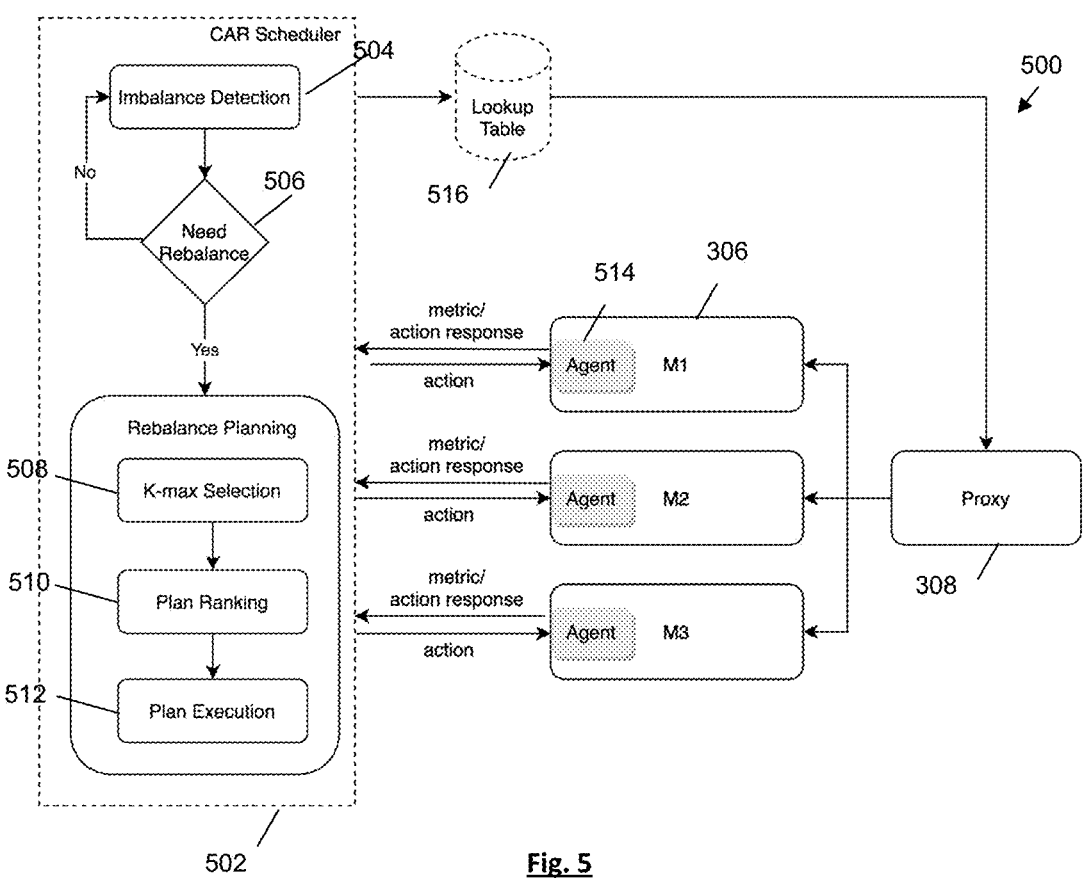
FIG. 5 is a flow diagram illustrating a first exemplary method of shard management.
FIG. 6 is a pseudo code listing of a first exemplary Algorithm 1.
Figure 7:
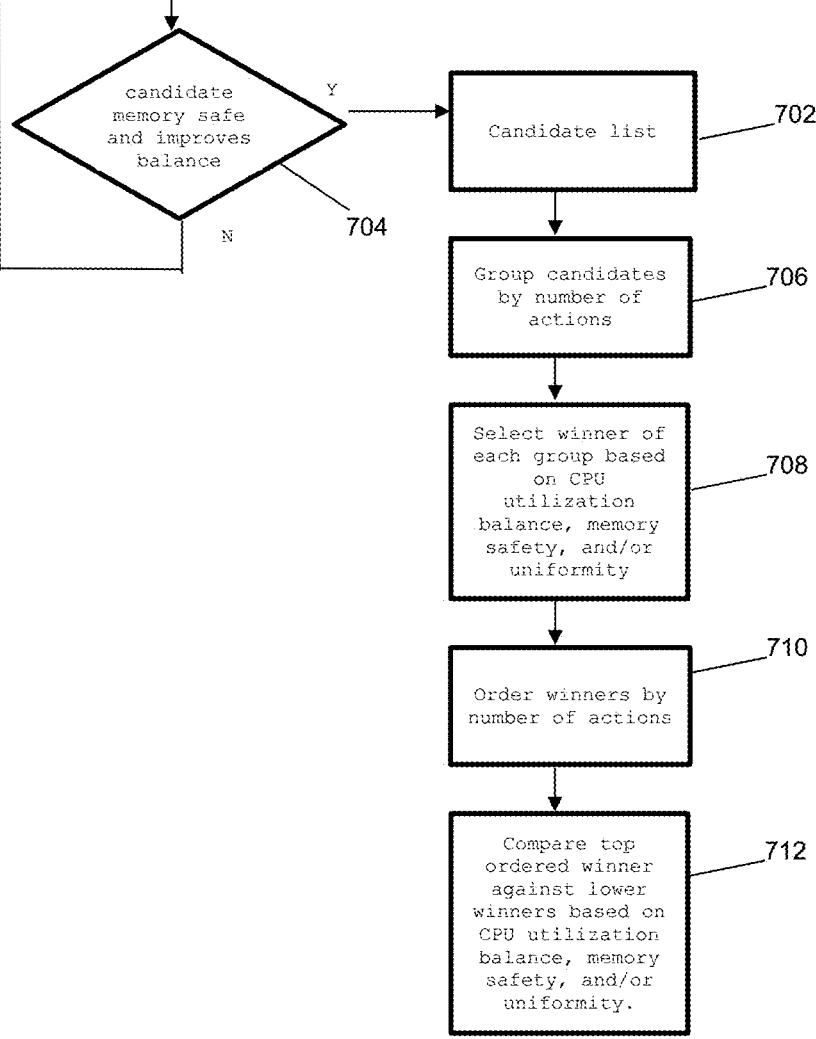
FIG. 7 is a flow diagram illustrating a first exemplary method of candidate selection and plan ranking.

Further, it will be appreciated that FIGS. 4, 5 and 7 and the foregoing description illustrate and describe a method performed in a communications server apparatus 102, the method comprising, under control of a processor 116 of the server apparatus:

determining whether rebalancing of a plurality of shard replicas stored on a plurality of server instances is required based on two or more quantitative metrics;

if rebalancing is required, selecting a plurality of candidate rebalancing plans; and ranking the candidates, and executing a selected rebalancing plan from the ranking if two or more quantitative metrics criteria are met for the selection.

In practical terms the system may be implemented by an agent running as a service on each virtual machine "VM" within the cloud infrastructure, together with a managing proxy server. Each VM includes an operating system such as Windows Server™ 2019 or Linux e.g.: Ubutu LTS 20.04.2, with a database instance such as Microsoft SQL™ 2019 enterprise version. Each VM is networked via a secure WAN within a firewall permitter. The system agent on each VM communicates dynamically, opportunistically, or periodically with the system proxy. The system proxy server may include various applications and running services including a web server.

The user interface 124 may be provided by an administrator logging to the proxy via a web page accessing the proxy web server. Alternatively, a command line interface may be provided using PuTTY or similar.

The system 100 may therefore collectively be implemented in the secure WAN, the VMs within the WAN, the databases and software running on each VM, and the system proxy server and any software running on the system proxy server. Alternatively, the system 100 may be a single device such as a server running a database, or a user device hailing a ride utilising a distributed shard. The system may be part of a larger ride sharing or ride hailing system, which allocates drivers to customers based on geographic information.

The database 126 described above may include records of each user, of each driver, financial records, lat/lon of driver/vehicle geographic location, current state, vehicle information and/or type of vehicle. For example if the vehicle is a hybrid, how many passengers it can carry, what is its maximum range, what is its $CO_2$ emissions on a particular route etc.

The database 126 is a key-value (KV) store, not a traditional relational database. A lookup table within the KV store is maintained by a 3rd-party library (e.g. ETCD), which can be either centralised or de-centralised. In a de-centralised scenario each machine syncs the lookup table to local storage in memory and forwards request based on the local lookup table (serves as a proxy).

To better cope with the increasing computational requests where the users are located in a number of geographically disparate markets, it may be desirable to use sharding of the database 126 to horizontally scale the system, which may effectively decouple the dependency between the storage and computational resources. For instance, one of the fundamental services provided by ride-hailing companies is finding the nearest driver to a given starting point. In a centralised service, all the locations of drivers are stored in memory in a virtual server infrastructure such as AWS or Azure. As the number of drivers grows, it becomes more and more impractical to vertically scale the virtual server instances to accommodate the increase of storage and computational resources. For example upwards of 10 GB might be required centrally for 1 Million drivers. Alternatively, in a decentralised service, sharding can be performed on geospatial data as the data storage can be naturally partitioned by geospatial information (e.g., by geohash or by city/country) and geospatial data is usually included in the request payload of the service (e.g., latitude and longitude). The requirement of storage and computational resources of each machine is significantly reduced as each machine only needs to store a subset of drivers and to serve corresponding computational requests partitioned by locations (shards). However, this can be problematic to implement, for example, when the shards are of different sizes.

In FIG. 3, a shard management system 300 is shown with a series of shards (a horizontal logical partition representing one serving unit). The system includes a series of replicas 304, with each replica duplicating the data of this shard. Shard replicas share the same sharding key. In other words each replica 304 is portion of a DB running on a specific VM 306. For stability and fault tolerance, one shard should have at least two or more replicas serving simultaneously. The replicas 304 are stored on a series of Virtual Machines (VM) 306 (each VM 306 maintaining one or multiple replicas). Lastly at least one proxy server 308 runs a router to dispatch requests to the relevant machine by a specific key.

In the example of FIG. 3, the communication server DB 126, may be implemented as a plurality of replicated shards, across a plurality of virtual server instances and/or availability zones. Therefore, in that case, the communication server 102, may represent one or more physical servers within a cloud infrastructure, running a plurality of virtual machine instances.

In the example of FIG. 3, shard R1 has two replicas running on instance M1 and M4 separately. Replica R1 and R3 run on the instance M1. There is no strict constraint that partitions must be isolated physically which means the replicas from two shards may share the same instance.

FIG. 4 shows a method 400 of processing a request in a system with multiple shards. When a request 402 comes to the proxy 308, it queries the instances 404 for the specific key in the request payload. For example, when a request for R1 arrives, the proxy 308 gets the corresponding instances of M1 and M4. The request will be dispatched 406 to M1 and M4 randomly or in a round-robin loop. The M1 and M4 have approximately equal probability to serve requests from R1.

In practice, due to business requirements, the load of traffic per shard may vary drastically and the performance of the system may depend on the sharding policy. When a machine is processing too many requests, the latency may spike as the CPU utilization keeps growing. A poorly sharded system may incur high latency in some machines and low utilisation of other machines and will consequently hinder the overall performance of the service. Therefore, it may be desirable to rebalance the distribution of shards on each machine dynamically in runtime to accommodate the change of load of requests to make sure each machine is evenly utilised.

The rebalance is handled by a scheduler, which manages the lifecycle of each replica by the following operations:

1. When a new shard onboards the system for the first time, the scheduler determines the adaptive instances running the replicas.
2. When a shard has not sufficient replicas, the scheduler determines the adaptive machines to spawn relevant replicas to guarantee usability.
3. When a machine has a high CPU utilisation, the scheduler creates and executes a rebalance plan by offloading some replicas on the target machine meanwhile onboarding them to relatively light machines.
4. When the overall CPU utilisation of a shard is too heavy or too slight, the scheduler may scale the replicas dynamically.

However, rebalance in runtime can be challenging in certain applications as Service Level Agreements (SLA) requirements may be breached under the vast volume of load traffic. Therefore, although the final target is to achieve load balance between machines in terms of CPU utilisation, during the rebalance procedure, each step needs to be carried out carefully to make sure the production system runs smoothly. Besides the overall CPU utilisation, multiple other factors may be considered, including:

In each step, each machine has to be memory-safe. Otherwise, it will cause machines to crash and affect the stability of the system;

Replicas of each shard are desired to be distributed among different availability zones for fault tolerance; and/or The overall performance of rebalance is measured by the time/steps it takes to converge. The faster it converges, the less impact it has on the system.

One or more of the requirements above may impose challenges for an efficient and resilient load balancing in runtime, in particular, neither CPU utilisation nor memory storage are available per machine after rebalance, which cannot be utilised directly to evaluate the effectiveness of a rebalance strategy. It is difficult to generate this information in advance as they are subject to both internal configurations (e.g., programming languages, platforms, and applications, hardware, etc) and external changes (e.g., network delay, unhealthy machines, spike of requests, etc). In contrast to existing load balance solutions which focus on a fixed metric such as memory usage, in order to meet the above requirement in runtime, a rebalance strategy may focus on shards with multi-objective evaluation metrics. As a result, a rebalance cannot be simply performed in a greedy manner to move replicas from heavy-weighted to light-weighted machines. An optimal solution may not exist or it will incur exponential time to enumerate all possible action sequences to evenly distribute the sharding units.

To better cope with these challenges, we propose an efficient and resilient framework called CPU-aware rebalancer (CAR) with a customised shard definition to perform a multi-objective oriented load balance.

FIG. 5 is a flow diagram illustrating a method 500, performed in a communications server apparatus, for a distributed sharding database related to a transportation service. A scheduler 502 (which may run on the proxy server or more generally communications server 102) may initiate shard management with a set of initial values for the sharding policy. The scheduler is a library used by onboarded services through calling a set of APIs. The scheduler 502 transmits data through communications network 108 using communications channels 110, 112, 114 to input-output module 122 of communications server apparatus 102, whereupon it is processed and stored in database 126. An imbalance detection algorithm 504 may iterate on a periodic basis or when an imbalance threshold is breached. If rebalancing is required 506, the scheduler will first select 508 a set of K candidates for evaluation, then rank 510 the candidates, and if there is a winner, it will implement 512 the winning candidate rebalancing.

The proxy server 308, the scheduler 502, and the lookup table may all be implemented as part of the communications server apparatus 102. The lookup table 516 and the shard management system 300 may be implemented as part of database 126.

The proxy 308 may be a virtual module for forwarding requests to the VM 306 based on lookup table 516. A proxy 308 may resides in each VM 306 as part of the local agent 514, so each VM 306 is a proxy 308 itself.

The proxy 308 on each VM 306 syncs the lookup table into local memory for forwarding request.

The lookup table is a key-value pair, with key as the sharding key (in our system we use city+wheels, e.g., Singapore 4-wheeler contains all the 4-wheel vehicle that serves in Singapore). Value is a list of VMs that serves this shard. Each VM will contain the Internet Protocol (IP) address, along with its current statistics (CPU/mem usage, qps, etc).

Metric Reporting

A local agent 514 is installed on each instance M1-M5. A series of metrics are continuously reported in a fixed frequency (frequency is configurable, e.g.: 1 minute or it can be changed dynamically) to the scheduler 502 including both resource metrics like utilisation of CPU, memory, storage, and other application-level metrics like used-heap, GC frequency, and serving latency. These metrics are stored in the look up table 516. When the rebalance plan is executed, the scheduler sends requests to the service such as load new shards. The action needs to be carried out successfully in order to proceed, therefore it is a synchronised command. The agent 514 is also waiting for the synchronised command from the scheduler 502.

For each metric, the imbalance detection module will generate a robust measurement by aggregating all the metric readings obtained over a time window and filtering the anomaly numbers instead of relying on a single result at a particular time. This measurement value will be used to represent the final metric at the current status. Without loss of generality, current status of the system is defined by $S=\{Q,C,M,AZ,R\}$ where Q measures the query per second (QPS) on each machine, C and M contains the CPU utilisation and memory consumption on each machine separately, AZ maps each machine to a discrete value of availability zone, which is used for fault tolerance and R(m) contains the set of replicas on machine m. To be more specific, C and M are measured as the used percentage of total capacity. For example, C(m) scales from 0 to 1 where 1 means 100% full CPU utilisation.

Firstly, we propose to use the imbalance factor as the metric to measure how imbalance the system is. Given a series of running k machines, the imbalance factor b is defined as $b=\max_{i=1 \ldots k}(C(m_i))-\min_{i=1 \ldots k}(C(m_i))$. It can be observed that b ranges from 0 to 1 where the smaller the value is, the more balance the system will become.

The imbalance detection algorithm 504 may monitor the metrics periodically, and a rebalance 506 will be triggered if $b>\beta$ where $\beta$ is a predefined threshold. When a rebalancing is needed, the implement winning candidate 512 must reduce b otherwise it will not be implemented.

As suggested by the sharding policy, rebalance is performed by changing the mapping between replicas and machines in the lookup table as each replica incurs different CPU load. Therefore, in order to evaluate the impact of rebalancing, CAR needs to maintain a portfolio for each replica which contains multiple dimensions of metrics for each resource. Given a machine m, its current status at time t is defined as $St(m)=(Q(m), C(m), M(m), AZ(m), R(m))$, the portfolio of replica $r_i$ on machine m is defined as $P(r_i)=Q(r_i)$, $C(r_i), M(r_i), AZ(r_i))$ and $P(r_i)$ is calculated based on St(m) as follows.

1) $Q(r_i)$ can be directly obtained from the metric reported from each agent as QPS can carry an extra tag to specify which shard it belongs to.

2) $C(r_i)=Q(r_i)/Q(m)*(C(m)-\Omega)$. As observed from the formula, the CPU utilisation on this replica is proportional to its QPS percentage over the total CPU utilisation incurred by the requests. This estimation is made under the assumption that each request will consume similar CPU load. We use $C(m)-\Omega$ to denote the total CPU utilisation incurred by the requests and $\Omega$ is a configurable constant which specifies the CPU consumption without any traffic. AWS or Azure provide APIs for onboarding services to query vCPU utilisation.

3) At the initial time $t_0$, with k machines and w shards, there are k memory consumption equations can be generated as $$\sum_{r \in R(m_1)} M(r) = M(m_1)$$

$$\sum_{r \in R(m_2)} M(r) = M(m_2)$$

$$\ldots$$

$$\sum_{r \in R(m_k)} M(r) = M(m_k)$$

A shard will have at least three sharding instances (replicas) serving simultaneously at different machines (to reach a consensus of a distributed system). We assume the memory consumption of two replicas are the same if they are in the same shard as the requests are usually evenly distributed across replicas in the same shards. This usually results from a round-robin load balance mechanism on the client side to make sure each replica shares the request load equally. Therefore, multiple replicas from the same shard will be treated as the same variable and there will be in total w variables in the above equations.

Since all the equations are linear, the formula above can be approximated resolved with linear regression with w total variables. Therefore, at the initial step $t_0$ we can have an estimate on each M(r). During the rebalance process, after each rebalance action, the memory consumption of the system will be updated and generated another set of k equations. We will include those equations to the existing equation set and perform linear regression on the new set. As more and more equations are included, the memory consumption estimation of each replica will be more accurate.

In practice, it is more difficult to estimate memory consumption than CPU load as it varies on different platforms and programming languages. For some languages like Golang, applied memory is cached aggressively in order to provide the best memory allocation performance. Therefore, sometimes, other metrics such as heap capacity, garbage collection (GC) behaviours need to be considered to facilitate the estimation. Languages such as Golang, Java, C #, engineers don't manage memory manually, instead the platform releases the unused object in runtime. For instance, it may periodically scan the memory, label and free the unused block. This process is important as it may impact system's runtime performance and stability. Since the memory layout and garbage collection process are not transparent, the measurement of actual memory size may be challenging.

4) $AZ(r_i)$ is decided by the availability zone of the machine which contains $r_i$.

The imbalance detection module gives each replica a portfolio reflecting the current state based on the observation from the past period and the portfolios will be used by the rebalance planning module.

The scheduler 502 is a library and onboarded services, where the onboarded services interact with the library via a suite of APIs. It is in charge of monitoring the metrics reported from agents, making correct rebalance decisions if possible, managing the rebalance progress, and to make sure the service is stable during the rebalance.

In a complete processing loop, each agent 514 collect metrics periodically and reports them to the scheduler 502. If the metrics indicate imbalance, the scheduler 502 will generate a rebalance plan which consists of a sequence of executive commands. The command would be sent to the relevant instance and synchronise the execution result. Whenever an agent receives a command, it operates the replica 304 in the target VM 306 by adding/removing a replica 304.

The factors mentioned in one or more embodiments (memory safety, imbalance reduction in CPU, uniformity), are factors considered to maintain service stability and/or performance. Other factors may be used depending on the requirements of the application. One or more embodiments may jointly consider these together in rebalancing and treat it as a multi-dimensional sharding problem.

A Multi-dimensional shard is different than single dimension (normal) shard in that:

1. Complexity of solving rebalance. Multi-dimension search space is exponentially larger than normal shard.

2. Since rebalance performs in runtime, system dynamics (cpu/mem changes based on qps, sometimes instances are killed/created due to unhealthy or auto-scaling, etc) impact the size of the shard. Measure/predict the actual size of the shard is also a challenging problem, especially in a multi-dimension scenario because each dimension needs to be measured/predicted properly.

The selection and ranking process is separated into several phases as shown in FIG. 7. K-max selection produces a number of plan candidates 702 where each of them satisfies 704 the memory limitation, providing a better balance factor b compared to the current system. The Plan Ranking sorts and rates candidates and returns the best plan. The ranking groups 706 the candidates by number of action steps. A winner from each group is selected 708 based on CPU utilisation balance, memory safety, and/or uniformity. The winners are ordered 710 based on number of action steps. The top ordered winner is compared 712 to the lower ordered winners in sequence, based on CPU utilisation balance, memory safety, and/or uniformity.

K-Max Selection Algorithm

The candidate selection 504 uses a K-max algorithm producing a number of candidate plans given the state S aggregated over the past window. A plan is defined as (actions, $S_{opt}$) where actions is an ordered executive action sequence, the action number in the plan is the amount of actions in the sequence, and $S_{opt}$ is the optimal state after executing the plan. The b of optimal state must be better than S. The K means the action number is no larger than K. An action is defined as action(r, $m_s$, $m_t$) representing the replica r moved from machine $m_s$ to $m_t$.

When a replica is moved from one instance/availability zone to another, we assume the portfolio of this replica remains the same (i.e., the memory consumption of this replica would not change if it is moved to another machine) as the move operation happens in a very short period of time. Therefore, the status of the system in each step can be easily derived given each replica's portfolio, which provides the flexibility of evaluating each plan without the execution and guarantees the system is runtime memory-safe.

The algorithm iterates each value from 1 to K. For each value, a series of candidates is generated then collected together into a set Z as the input for the next phase.

The pseudo code of K-max algorithm is shown in FIG. 8.

Before line-29, S is only memory-safe for the final state, therefore it calls sub procedure GeneratePlan to organise the actions' execution sequence to ensure the plan is memory-safe.

The GeneratePlan can be separated into two stages in detail.

The first stage GenUnsortedActions generates an array of unordered actions given S and $S_{opt}$. We denote R(m, S) as a set of unique replicas of machine m under a state S. We define a set difference for m in terms of the state transform $S \rightarrow S_{opt}$ $$\cdot R(m)^+ = \{(m, r)|r \in R(m, S_{opt}) Vr \notin R(m, S)\}$$

$$\cdot R(m)^- = \{(m, r)|r \in R(m, S) Vr \notin R(m, S_{opt})\}$$

The positive set $$\bigcup_i R(m_i)^+$$

is equal to negative set $$\bigcup_i R(m_i)^-,$$

and $$\bigcup_i R(m_i)^+ \cap \bigcup_i R(m_i)^- = \phi.$$

The pseudo code is shown in FIG. 9.

An example is given below:
machine1 has replica a in state S
machine2 has replica b in state S
machine3 has no replica in state S
machine4 has no replica in state S
After rebalance:
machine1 has no replica in state $S_{opt}$
machine2 has no replica in state $S_{opt}$
machine3 has replica a in state $S_{opt}$
machine4 has replica b in state $S_{opt}$
During a rebalance process,
replica a move from machine1 to machine3 and
replica b move from machine2 to machine4
Then:R(1,S)=a R(1,$S_{opt}$)=empty
R(2,S)=b R(2,$S_{opt}$)=empty
R(3,S)=empty R(3,$S_{opt}$)=a
R(4,S)=empty R(4,$S_{opt}$)=b
R(1)+=empty R(1)−=(1,a)
R(2)+=empty R(2)−=(2,b)
R(3)+=(3,a) R(3)−=empty
R(4)+=(4,b) R(4)−=empty
UiR($m_i$)+={(3,a),(4,b)} means all the incoming replica at the target machine
UiR($m_i$)−={(1,a),(2,b)} means all the outgoing replica at the source machine.

So there is no sharing items between two, because you cannot put/fetch the same replica for the same machine.

The second stage SortActions generates the final action sequence given the unordered actions where any middle state during the plan execution is memory-safe. Note that such a sorting process may not output a valid result.

As illustrated in FIG. 10, it first builds a directed graph G where the vertex in G denotes a machine, the edge connecting two vertices denotes a move action between two machines. For an action(r, $m_s$, $m_t$), it links an edge from $m_s$ to $m_t$. The weight of the vertex represents the memory of the machine. Then, the sorting process equals finding edge sequences. It prior chooses the edges connected to the zero outdegree vertex, and lastly chooses the edges connecting zero indegree vertices. If there is no zero outdegree edge left, it selects the most memory safe edge to cut off the cycle. The operation is recursively done until no edges left. The complete pseudo code is shown in FIG. 11.

In practice, K is determined depending on the time of adding one replica on a machine. In the iterating of K-max, 100 (R) times may be large enough to generate sufficient candidates, but it can be selected depending on the requirements of the application.

Ranking Algorithm

This ranking algorithm 510 produces a best selected rebalance plan tradeoff between multiple criteria and limitations. The algorithm 510 uses a pair-wise algorithm to select the best candidate from the given multiple candidates. There is an initial winner selected from the candidates in round 1, then in round 2 for each rank stage, a challenger compares to the winner, and replaces the winner if wins or keeps the winner as same.

The shard policy may require initial values for the ranking evaluation criteria. The value should be s<f<ξ<F relatively. s could be 0.01. f could be 0.1. ξ could be 0.2. F could be 0.3. These can be selected based on the requirements of the application.

There are four criteria to evaluate the rebalancing plan sorted in order of highest priority:

Number of actions in one rebalancing plan. The fewer the number of actions is, the faster the system will be able to change to a stable state and to avoid potential high CPU utilisation.

The final imbalance factor b after the execution of the plan.

Memory-safe level, which is used to measure the memory consumption level of the whole system. A system is α-safe when the used memory percentage of each machine is no larger than α. A rebalance plan is α-safe when the system is α-safe in each step during the execution of the plan.

Uniformity level of availability zone after the rebalance, which is used to measure uniformity on the distribution of replicas on each availability zone, the more uniform it is, the more fault-tolerance the system will become. Uniformity level is measured by uniformity score as demonstrated in algorithm 1. The higher the score the less uniform the system is. Ideally, each replica in each shard lies on different availability zones, resulting in the score of 0.

There is one memory limitation. A system is runtime memory-safe if there is no out-of-memory issue for any instance in the system. In practice, during a move action, the replica needs to be added in the target instance first before removing it in the old machine to make sure the system maintains runtime memory-safe after the move action. A rebalance plan is runtime memory-safe if the system is always runtime memory-safe during the plan execution period.

We denote the imbalance factor of the system before rebalancing as b and the imbalance factor yielded by current challenger as b', and current winner as b". We denote the uniformity score as c' and c" for current challenger and winner respectively. There are two predefined memory safe-level, $\alpha_1$-safe and $\alpha_2$-safe where $\alpha_1$-safe will be a safer level (i.e., $\alpha_2 > \alpha_1$). All the parameters mentioned below will be non-negative values.

The evaluation is performed in two rounds. In the first round, candidates with the same number of actions will be grouped together. In each battle, the challenger replaces the current winner if the below conditions pass.

The challenger is $\alpha_1$-safe and b"<b'. (The challenger is better than the winner in both memory and imbalance factor.)

The challenger is $\alpha_1$-safe, |b"−b'|≤s, and c'<c". (The challenger is better than the winner in both memory and uniform with tiny imbalance sacrifice.)

The challenger is $\alpha_2$-safe, and b'−b">f. (The challenger incurs more memory than $\alpha_1$-safe, therefore a significant improvement of imbalance factor is required.)

In the final round, all the candidate winners are sorted by number of actions in ascending order. Starting from the first candidate as the initial winner, others in the sorted sequence are challengers. Challenger winner will be replaced by the following principle. When the final winner is determined, the ranking algorithm terminates immediately.

Early termination—If the current winner is $\alpha_1$-safe with b'−b>F, current candidate becomes final winner. F is the desired imbalance factor after rebalancing.

The challenger is $\alpha_1$-safe and b'−b">f. (The challenger gains safer memory and a significant improvement of imbalance factor, although require more actions.)

The challenger is $\alpha_2$-safe and b'−b">ξ where ξ>f. (The challenger gains an extreme improvement with more actions and memory sacrifice.)

Early termination—A candidate winner becomes final winner if it wins Z times.

Plan Execution

The final winner must have a minimum imbalance factor improvement $b_m$, otherwise the plan will not be executed. This parameter controls how sensitive the rebalancer can be and will potentially reduce the overhead incurred by rebalancing.

Whenever a winner is elected, the plan execution module will send corresponding actions to the relevant machines. For each move action, it will communicate with the lookup table to forward the requests to the new machines. It maintains the synchronisation between machines and scheduler and guarantees the plan execution runs smoothly and successfully.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications server apparatus for a distributed sharding database related to a transportation service comprising a processor and a memory, the communications server apparatus being configured, under control of the processor, to execute instructions stored in the memory to:

determine whether rebalancing of a plurality of shard replicas stored on a plurality of server instances is required based on two or more quantitative metrics;

if rebalancing is required, select a plurality of candidate rebalancing plans, each candidate rebalancing plan including a sequence of one or more actions, each action defining an operation to move a shard replica from one server instance to another; and rank the candidate rebalancing plans, wherein the ranking of candidate rebalancing plans includes grouping the candidate rebalancing plans according to a number of actions to implement each candidate rebalancing plan, and execute a selected candidate rebalancing plan from the ranking if two or more quantitative metrics criteria are met for the selected candidate rebalancing plan; wherein the two or more quantitative metrics criteria include a number of actions to implement each candidate rebalancing plan, and a CPU utilisation balance; wherein each group of candidate rebalancing plans is ranked based on a selection of at least one of: the CPU utilisation balance, a memory safety, a level of redundancy across different availability zones, and any combination thereof, and the highest ranked candidate rebalancing plans from each group of candidate rebalancing plans are ordered based on the number of actions to implement each candidate rebalancing plan, and the highest ranked candidate rebalancing plan is subsequently compared to each of the other highest ranked candidate rebalancing plans in order, based on a selection of at least one of: the CPU utilisation balance, the memory safety, the level of redundancy across different availability zones, and any combination thereof.

2. The communications server apparatus of claim 1 wherein the two or more quantitative metrics criteria further include a memory safety, and a level of redundancy across different availability zones.

3. The communications server apparatus of claim 1 wherein the CPU utilisation balance is based on comparing a CPU utilisation on each of the plurality of server instances.

4. The communications server apparatus of claim 1 wherein the selection of candidates is based on at least one of (i) each potential candidate rebalancing plan satisfying a memory limitation test, and (ii) each potential candidate rebalancing plan improving a CPU utilisation balance for the plurality of server instances.

5. The communications server apparatus of claim 1 wherein the two or more quantitative metrics criteria include a minimum CPU utilisation balance improvement.

6. A method, performed in a distributed sharding database related to a transportation service, the method comprising, under control of processors for a plurality of server instances storing a plurality of shard replicas:

determining whether rebalancing is required based on a CPU utilisation balance for the plurality of server instances;

selecting candidate replacing plans based on each potential candidate replacing plan satisfying a memory limitation test, and/or each potential candidate improving the CPU utilisation balance, wherein each candidate replacing plan includes a sequence of one or more actions, each action defining an operation to move a shard replica from one server instance to another;

grouping the candidate replacing plans according to the number of actions to implement each candidate replacing plan;

ranking each group of candidate replacing plans based on a selection of at least one of: the CPU utilisation balance, a memory safety, a level of redundancy across different availability zones, and any combination thereof;

ordering the group of highest ranked candidate replacing plans from each group of candidate replacing plans based on the number of actions to implement each candidate replacing plan, and identifying a highest ranked candidate replacing plan as the candidate replacing plan from the group of highest ranked candidate replacing plans having the fewest number of actions;

comparing the highest ranked candidate replacing plan to each of the other candidate replacing plans in the group of highest ranked candidate replacing plans in order, based on a selection of at least one of: the CPU utilisation balance, a memory safety, a level of redundancy across different availability zones, and any combination thereof; and executing the highest ranked candidate replacing plan if the comparison exceeds at least one of the CPU utilisation balance, the memory safety, the level of redundancy across different availability zones, and any combination thereof.

7. A non-transitory storage medium storing instructions, which when executed by a processor, cause the processor to perform the method of claim 6.

\*    \*    \*    \*    \*